(12) United States Patent
Itoh et al.

(10) Patent No.: US 6,828,004 B2
(45) Date of Patent: Dec. 7, 2004

(54) CONNECTED FASTENING MEMBERS AND PROCESS FOR PRODUCTION OF RESIN MOLDED ARTICLE WITH FASTENING MEMBER

(75) Inventors: Hiroshi Itoh, Osaka (JP); Kunihiko Shimamura, Sakai (JP); Tooru Tanokura, Osaka (JP); Shiro Ogawa, Osaka (JP); Takashi Saeki, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/263,777

(22) Filed: Oct. 4, 2002

(65) Prior Publication Data

US 2003/0072912 A1 Apr. 17, 2003

(30) Foreign Application Priority Data

Oct. 4, 2001 (JP) .................................. 2001-308141
Oct. 18, 2001 (JP) .................................. 2001-320207

(51) Int. Cl.[7] ............................................. B32B 3/06
(52) U.S. Cl. ........................ 428/99; 428/61; 428/100; 428/163; 428/900; 24/303; 24/304; 24/442
(58) Field of Search ............................ 428/99, 100, 61, 428/163, 900, 306.6; 24/303, 304, 442

(56) References Cited

U.S. PATENT DOCUMENTS 4,470,857 A    9/1984  Casalou

FOREIGN PATENT DOCUMENTS

| EP | 0 904 707 | 3/1999 |
|----|-----------|--------|
| EP | 1 116 450 | 7/2001 |
| JP | 5-192939  | 8/1993 |

*Primary Examiner*—Nasser Ahmad
*Assistant Examiner*—Jane Rhee
(74) *Attorney, Agent, or Firm*—Oblon, Spivak, McClelland, Maier & Neustadt, P.C.

(57) ABSTRACT

Connected fastening members and method for mold-in articles. The connected fastening members include a plurality of mold-in fastening members each having a substrate and a predetermined number of engaging elements formed on a first or front surface of the substrate. The mold-in fastening members are connected with each other by a connecting member that is disposed on a second or the back surface thereof. Using the connected fastening members, a plurality of the fastening members can be easily fit to a recessed portion of a mold in a single operation, resulting in improved working efficiency.

18 Claims, 5 Drawing Sheets

CONNECTED FASTENING MEMBERS AND PROCESS FOR PRODUCTION OF RESIN MOLDED ARTICLE WITH FASTENING MEMBER

CROSS-REFERENCE TO RELATED APPLICATIONS

This application is based upon and claims the benefit of priority from the prior Japanese Patent Application Nos. 2001-308141, filed Oct. 4, 2001, and 2001-320207, filed Oct. 18, 2001, the entire contents of which are hereby incorporated herein by reference.

BACKGROUND OF THE INVENTION

1. Field of the Invention

The present invention relates to a molded resin article such as automotive seat cushions and office chair cushions, and more particularly to a mold-in fastening member embedded in the cushion in which upholstery material such as cloth is fixed to the cushion.

2. Discussion of the Background

An automotive seat or office chair seat is generally produced by covering the surface of a cushion made of foamed polyurethane or the like with a seat cover (upholstery material). In a background production, a so-called "Hogring" method is employed, in which a cushion having molded-in wires is produced by embedding wires retained in a recess of a mold into the cushion, and the seat cover is attached to the cushion by a large number of metal fixing members that engage the molded-in wires with the seat cover. The procedure of the Hogring method is accomplished by the aid of an electric tool.

Recently, a new molding method has been proposed for the production of an automotive seat, for example, in Japanese Patent Application Laid-Open No. 2001-260150. This "mold-in" method involves fitting fastening members, i.e., flat fastener tapes, each having a large number of engaging elements (hook elements) on its top surface in a recessed position of a mold, injecting a foaming resin into the mold, and expanding the resin such that a portion of each fastening member is integrally embedded in the surface of the cushion and the engaging elements are bared on its outer surface. The cushion is finally covered with a seat cover having on a back surface elements (loop elements) capable of engaging with the engaging elements of the fastening members.

In the mold-in method, a plurality of fastening members are provided on a resin molded article to ensure the close contact of a upholstery material with the resin molded article through its wide surface, thereby producing a product having a good appearance. Until now, a plurality of the fastening members in the form of long and narrow tapes have been manually fit to respective recessed portions of a mold.

SUMMARY OF THE INVENTION

The inventors of the present invention recognized that in the background mold-in methods, since operators must set long and narrow fastening members one by one into the recessed portions of a mold, the setting procedure is considerably time-consuming. Therefore, it has been required to improve assembly efficiency.

Accordingly, one object of the present invention is to solve the above-noted and other problems. To solve these and other problems, the present invention provides connected fastening members that enable simultaneous fitting of fastening members to corresponding recessed portions of a mold in a single operation.

According to one example of the present invention, connected fastening members include a plurality of mold-in fastening members each including a substrate, a first surface having a number of engaging elements, a second surface with no engaging element, and connecting members for connecting the mold-in fastening members. The mold-in fastening members are arranged in juxtaposition, and the connecting members are disposed to cover at least a part of the second surface of each mold-in fastening member.

In one exemplary embodiment, the mold-in fastening members are disposed with lengthwise ends spaced from each other at predetermined intervals, or disposed substantially in close contact with each other without leaving space between the lengthwise ends. The connecting member preferably include a resin molded article or a porous material.

According to another example, the present invention also provides a process for producing a molded article with fastening members including fitting each fastening member of the connected fastening members to a corresponding recess formed in a mold with the engaging elements facing a bottom surface of the recess, injecting a resin into the mold, and curing the resin.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
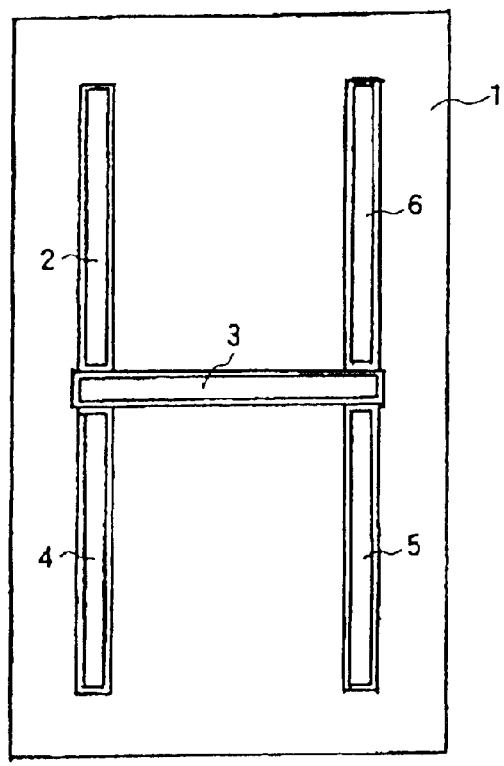
FIG. 1 is a plan view showing a recessed portion of a mold for receiving connected fastening members according to the present invention.

The present invention will be described by referring to the accompanying drawings in which like reference numerals indicate identical or corresponding parts throughout the drawings.

FIG. 1 illustrates a plan view showing an arrangement of a plurality of recessed portions at an inner bottom of a mold. Five recessed portions 2 through 6 are arranged in an exemplary H-shape on the inner bottom 1 of the mold. Tape-like fastening members (not shown) are fit to the respective recessed portions, with the front surface (engaging surface) down. The arrangement shown in FIG. 1 is for receiving connected fastening members having a plurality of mold-in fastening members that are disposed with their lengthwise ends spaced from each other at predetermined distances and connected together by a flexible connecting member at back surfaces. The arrangement shown in FIG. 1 may be modified by uniting the recessed portions 2 and 4 and uniting the recessed portions 5 and 6 to form two continuous long recessed portions. Connected fastening members for this arrangement have two paralleled long fastening members and a fastening member corresponding to the recessed portion 3, which is interposed between and closely to the mid portions of the long fastening members in a shunt configuration. Namely, in the connected fastening members for this recess arrangement, two fastening members are connected at one connecting portion.

Figure 2:
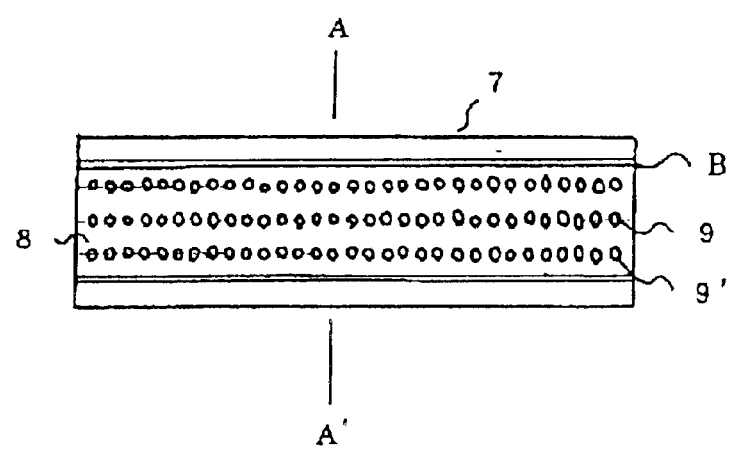
FIG. 2 is a plan view showing a front surface of an embodiment of the fastening member used in the present invention.
Figure 3:
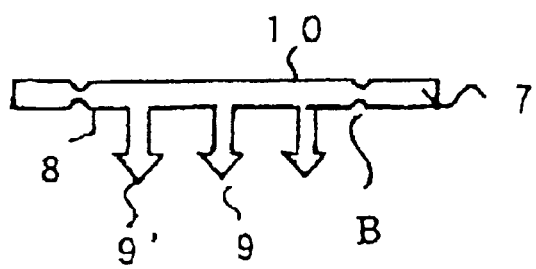
FIG. 3 is a sectional view of the fastening member taken along the line A-A' of FIG. 2.

FIG. 2 illustrates a plan view showing a fastening member that may be connected to a mold. FIG. 3 illustrates a sectional view of the fastening member taken along the line A-A' of FIG. 2. The fastening member used in the present invention includes a substrate 7 and a number of engaging elements 9, 9' provided on a front surface 8 of the substrate 7. Each engaging element 9, 9' has a bulged head portion that is an appropriate shape such as, but not limited to, a mushroom-shape, an arrowhead-shape, or a hook-shape. The engaging elements on the surface of the fastening member engage with loop elements formed on a back surface of an upholstery material mentioned below to closely secure the upholstery material onto the molded article.

A back surface 10 of the substrate may be flat. Alternatively, continuous ridges (not shown) that serve as anchoring elements for the resin molded article may be formed on the back surface. With the anchoring elements on the back surface, the fastening members can be firmly bonded to the resin molded article. Further, as described hereinafter, a continuous groove (shown by B in FIGS. 2 and 3) may be formed along lateral sides to allow the lateral side portions to bend flexibly against the substrate body. By providing such continuous grooves, the lateral side portions can closely contact the shoulder of the recessed portion of a mold. Although formed on both the front and back surfaces of the substrate in FIG. 3, the continuous groove B may be formed on either of the front and back surfaces. In addition, the front or back surface of the substrate may be provided with a ferrite-containing resin layer or any other appropriate material to easily fit the connected fastening members to a mold by magnetic attraction of magnets embedded in the bottom of corresponding recessed portions of the mold. This modification is also effective for preventing a liquid resin from penetrating into the recessed portion.

The fastening member of the present invention may be made of thermoplastic resins such as polyolefin resins, polyester resins, and polyamide resins. Of these thermoplastic resins, the polyolefin resins, for example polypropylene, are preferred in view of moldability and flexibility.

The detailed structure of the fastening member may be selected depending on its applications. For example, when applied to automotive seats, the fastening member usually has a width of 5 to 50 mm, preferably 10 to 30 mm, and a length of 10 to 100 cm, preferably 15 to 70 cm. The thickness of the substrate is preferably 0.2 to 1.0 mm, more preferably 0.3 to 0.7 mm.

The height of each engaging element is not particularly restricted, and preferably 1 to 10 mm, more preferably 1.5 to 6 mm. The engaging elements may be arranged in a single row or in a plurality of rows depending on the width of the substrate. The density of the engaging elements is preferably 30 to 100 per $cm^2$. The anchoring elements in the form of continuous ridges may be arranged in a single row or in a plurality of rows on the back surface of the substrate.

The fastening member may be produced by melt-extruding the above thermoplastic resin through a nozzle with suitable slits to form a tape having a front surface with a row of continuous ridges, making a number of cuts along each continuous ridge at small intervals, and then drawing the tape in the lengthwise direction to form a number of engaging elements on the front surface. Further, if the anchoring elements are formed on the back surface of the substrate, the fastening member may be produced in the same manner as above except for forming continuous ridges for the anchoring elements using a nozzle having slits corresponding to each anchoring element.

Figure 4:
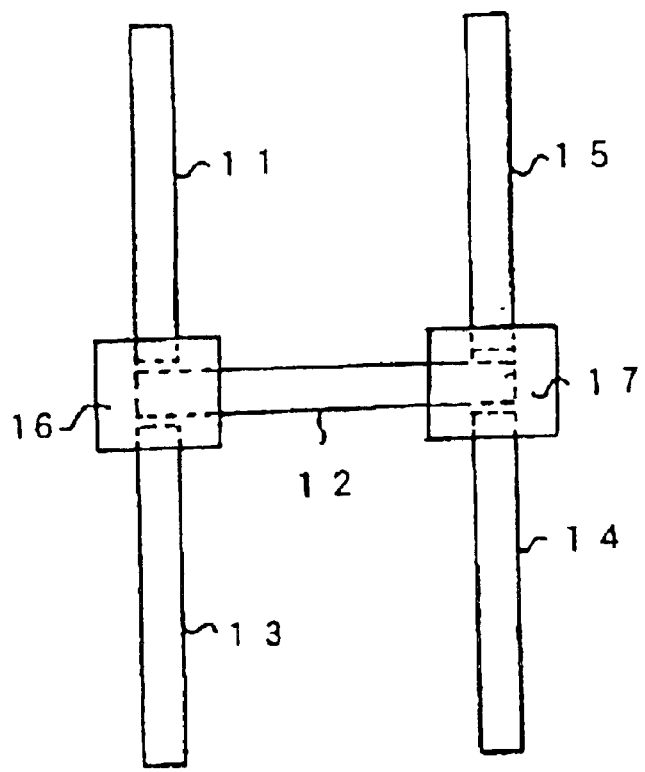
FIG. 4 is a plan view showing a back surface of an embodiment of the connected fastening members according to the present invention to be fit to the mold shown in FIG. 1.

FIG. 4 illustrates a plan view showing an embodiment of the connected fastening members according to the present invention as viewed from the back surface (from the side opposite to the surface with engaging elements). Five fastening members 11–15 arranged in an H-shape are connected together by connecting members 16 and 17 at portions in which lengthwise ends of the fastening members are gathered together.

Two of the fastening members are connected at the lateral edge of one and the lengthwise end of the other, or connected at the butting lengthwise ends of two. In FIG. 4, all the five fastening members are connected together at the lengthwise ends thereof. Two or more fastening members are connected together by a single connecting member. In the case of connecting at butting lengthwise ends, three or four fastening members are connected together by a single connecting member. In the case of connecting between the lateral edge and the lengthwise end, two or three fastening members are connected together by a single connecting member. As described below, the fastening members may be connected leaving no gap therebetween.

In one embodiment of the present invention, a plurality of fastening members are disposed such that the lengthwise ends thereof are spaced from each other at predetermined intervals. However, when the fastening members are imbricately disposed, for example, disposed one on another without leaving a space, a difference in the level occurs. Therefore, care must be taken during the mold-in forming to prevent undesired penetration of a liquid resin to the surface of the substrate with the engaging elements. By connecting the fastening members butting each other without leaving a gap, the difference in the level can be avoided.

FIGS. 5 to 10 illustrate other embodiments of the connected fastening members of the present invention and recessed portions of molds suitable for receiving them.

Figure 5:
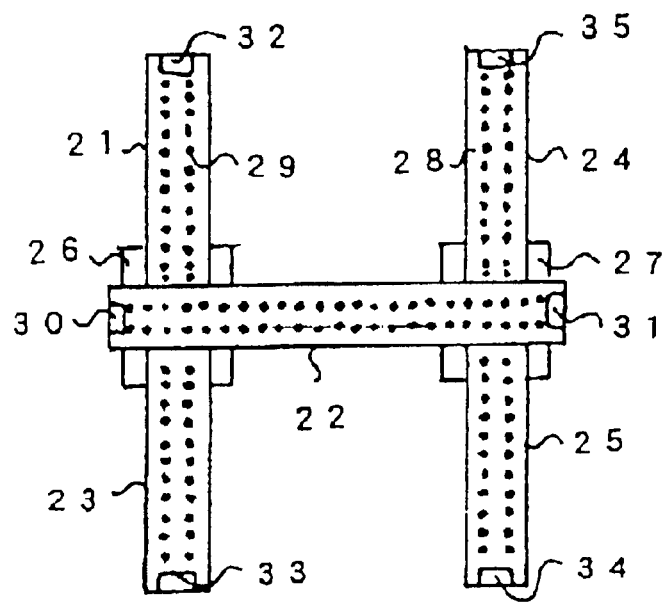
FIG. 5 is a plan view showing a front surface of another embodiment of the connected fastening members according to the present invention.

FIG. 5 is a plan view showing an embodiment of the connected fastening members of the present invention as viewed from the front surface with engaging elements. Five fastening members 21–25 are connected together by two connecting members 26, 27. More specifically, two fastening members 21, 23 vertically aligned are connected with the transversely arranged fastening member 22 without leaving a gap therebetween and without making a difference in the level between the substrate surfaces. Each of the fastening members is provided on the front surface thereof with a number of engaging elements (hook-like elements) 28, 29.

Figure 7:
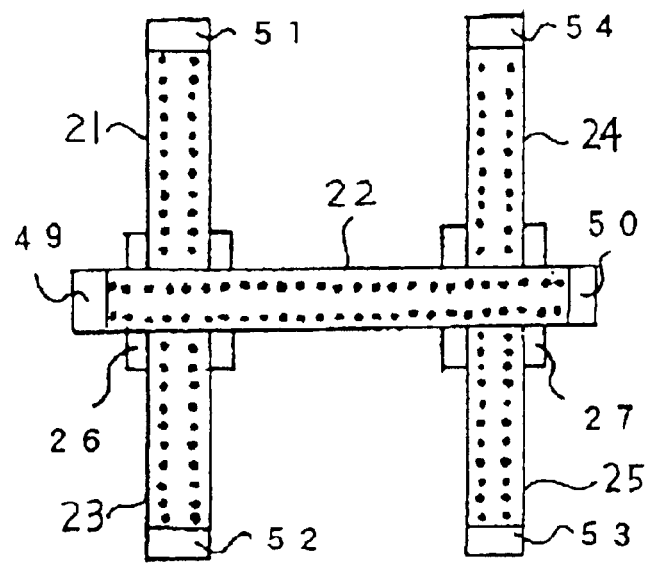
FIG. 7 is a plan view showing a front surface of a further embodiment of the connected fastening members according to the present invention.
Figure 9:
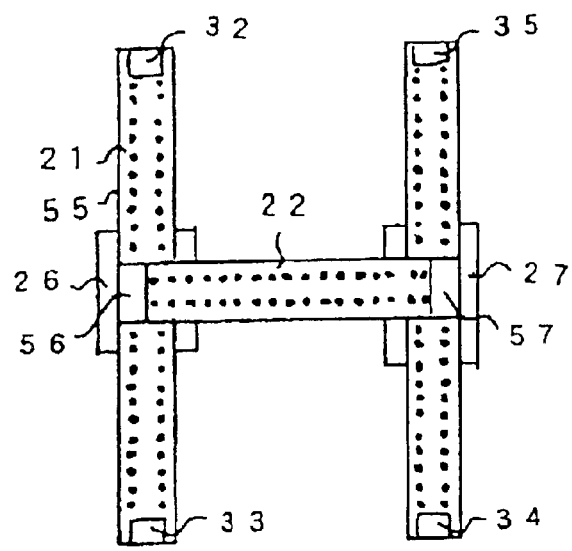
FIG. 9 is a plan view showing a front surface of a still further embodiment of the connected fastening members according to the present invention.

The fastening members shown in FIGS. 5, 7, and 9 are preferably provided, as described above, at each of the opposite lateral side portions with a groove (not shown) continuously extending along the longitudinal direction for rendering the lateral side portion flexible against the substrate body. Specifically, the groove at the boundary between the lateral side portion and the substrate extremely reduces the thickness of the substrate to allow the lateral side portion to easily bend against the substrate body. As a result, the lateral side portion closely contacts the shoulder of the recessed portion of a mold to effectively prevent a liquid resin from penetrating into the recessed portion through gaps. The grooves may be formed on either or both of the front and back surfaces of the substrate. The depth of the groove (total depth of front and back grooves when formed on both the surfaces) is preferably about 40 to 80% of the thickness of the substrate.

To maintain the connected structure, a connecting member 26 is fitted to the back surfaces of the fastening members 21, 22 and 23. The other two fastening members 24, 25 aligned vertically and the transversely arranged fastening member 22 are connected by a connecting member 27.

On the surface with engaging elements at opposite lengthwise ends of the transversely arranged fastening member 22, porous seal members 30, 31 made of fibrous material or foamed resin are provided to allow a liquid molding resin to partially penetrate thereinto through the lengthwise ends. Also, the vertically arranged fastening members 21, 23, 24, 25 are similarly provided at their free lengthwise ends with porous seal members 32, 33, 34, 35. The liquid resin penetrated into the seal members from the lengthwise ends is foamed and cured therein, thereby preventing the liquid resin from penetrating beyond the seal members. The seal members preferably have such a size as can be received in the recessed portion of a mold.

Figure 6:
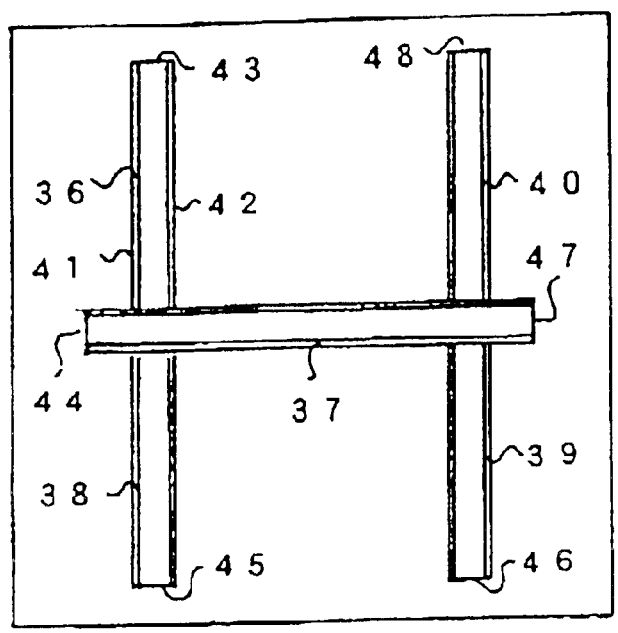
FIG. 6 is a plan view showing a recessed portion of a mold for receiving the connected fastening members shown in FIG. 5.

The connected fastening members shown in FIG. 5 are fit to the recessed portion of a mold as shown in FIG. 6. The recessed portion shown in FIG. 6 includes five recesses 36–40 configured to receive the corresponding fastening members 21–25. Each recess is deep enough to receive the fastening member and two shoulders 41, 42 defining the recess. When fitting the connected fastening members to the recessed portion, each fastening member is fit to the corresponding recess. The connected fastening members have both lateral side portions on the shoulders such that the lateral side portions closely contact the shoulders. Thus, the liquid molding resin is prevented from penetrating into the recess through the gap between the lateral side portions and the shoulders, and thereby burying the engaging elements with the resin. To ensure the close contact between the lateral side portions of the fastening members and the shoulders of the recesses, the thickness of the lateral side portions may be reduced to render the lateral side portions flexible relative to the substrate body. This method may also be used as alternative for the formation of the grooves as mentioned above.

The lengthwise ends 43–48 of the recesses are open ends. When the connected fastening members shown in FIG. 5 are fit to the recessed portion, the opposite lateral side portions of each fastening member are brought into close contact with the shoulders of the corresponding recess. The seal members 30, 31 provided at the opposite lengthwise ends of the transversely arranged fastening member 22 prevent the liquid molding resin from penetrating into the recess through the lengthwise ends 44, 47. To complete the close contact between the lateral side portions of the fastening member and the shoulders of the recess at the connected portion, it is important to smoothly connect the fastening members not to result in a difference in level between the substrate surfaces. The lengthwise ends of the vertically arranged fastening members 21, 23, 24, 25 are also sealed with seal members 32–35 to prevent the liquid resin from penetrating into the recess through the open ends 43, 45, 46, 48.

Further, the fitting of the fastening members to the recesses and the close contact therebetween may be facilitated and ensured by a magnetic attraction between a magnet embedded in the bottom of the recessed portion of a mold and a ferrite-containing layer formed on the fastening members. Alternatively, the fastening members may be provided with both the ferrite-containing layer and the grooves. The ferrite-containing layer is preferably formed between rows of the engaging elements.

FIG. 7 illustrates a plan view of another embodiment of the connected fastening members according to the present invention as viewed from the surface having the hook-like engaging elements. The fastening members 21, 22, 23, 24, and 25 shown in FIG. 7 are connected together in the same manner as in the connected fastening members of FIG. 5, except that the structure of the lengthwise ends of the fastening members is different from that of FIG. 5. Namely, a flat portion 51–54 is formed at the lengthwise end of each fastening member 21, 23, 24, and 25 by partially cutting away the engaging elements from the substrate. At the lengthwise ends of the transversely arranged fastening member 22, flat portions 49, 50 are provided. Flat portions 51–54 are also provided at the lengthwise ends of the vertically arranged fastening members 21, 23, 24, and 25. The other parts of the structure are similar to those shown in FIG. 5.

Figure 8:
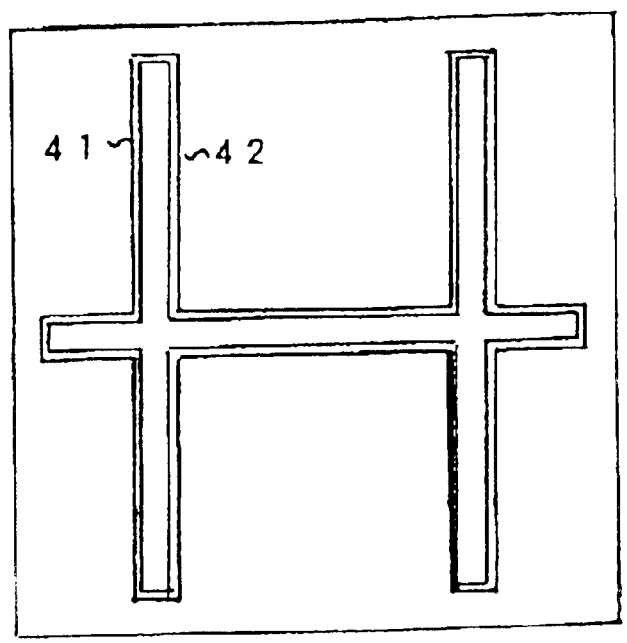
FIG. 8 is a plan view showing a recessed portion of a mold for receiving the connected fastening members shown in FIG. 7.

FIG. 8 illustrates a recessed portion of a mold for receiving the connected fastening members of FIG. 7, which includes five recesses integrally and continuously formed. The shoulders 41 and 42 of the recess continuously extend along its entire periphery, with no open end. When the connected fastening members of FIG. 7 are fit to the recessed portion of FIG. 8, the opposite lateral side portions of the fastening members come into close contact with the shoulders 41 and 42 of the recess, and the six flat portions provided at the lengthwise ends of the fastening members also come into close contact with the shoulder at the corresponding six ends of the recesses, thereby preventing the liquid resin from penetrating into the recess through the gap between the periphery of the recess and the fastening members. In this structure, the close contact between the connected fastening members and the shoulders 41 and 42 of the recess may be enhanced by a magnetic attraction between a magnet provided at the recess and a ferrite-containing layer formed on the fastening members.

FIG. 9 illustrates a plan view of a still another embodiment of the connected fastening members according to the present invention as viewed from the surface having the hook-like engaging elements. The transversely arranged fastening member 22 is provided at its opposite lengthwise ends with flat portions 56, 57 having no engaging elements. In the following, the connecting portion of the fastening members shown in FIG. 9 is explained. A vertically arranged fastening member 21 is connected with the transversely arranged fastening member 22 such that the outer lateral side 55 of the fastening member 21 and the outer left side of the flat portion 56 of the fastening member 22 are continuously aligned in a straight line. This continuous linear alignment is important to fit the connected fastening members to the recessed portion of a mold without leaving a gap. The vertically arranged fastening member 21 and the transversely arranged fastening member 22 are connected together by the connecting member 26, and thus are located on the same plane without leaving a gap. The connecting portion at right side is similarly formed. At each lengthwise end of the vertically arranged fastening members, are provided seal members 32–35 similar to those explained in FIG. 5.

In the present invention the transversely arranged fastening member may be connected with the vertically arranged fastening members at the connecting portion such that the outer side of the flat portion and the outer lateral side of the flexible lateral end portion (lateral end portion that is made flexible by forming the grooves or reducing its thickness) are aligned in a nearly straight line. Therefore, the transversely arranged fastening member may transversely project slightly beyond the outer lateral side of the vertically arranged fastening member. With this structure, the penetration of a liquid resin into the recess can be effectively prevented, for example, in a manner described below. From the opposite lengthwise ends of the transversely arranged fastening member, the engaging elements in a portion to be brought into butting against the outer shoulder of the recess are removed. On the projecting portion beyond the outer shoulder of the recess, a magnetic layer is provided such that the both ends of the fastening member and the both outer shoulders of the recess are brought into close contact, without leaving a gap, by magnetic attraction with magnets disposed on a mold at the portions corresponding to the projecting portions.

Figure 10:
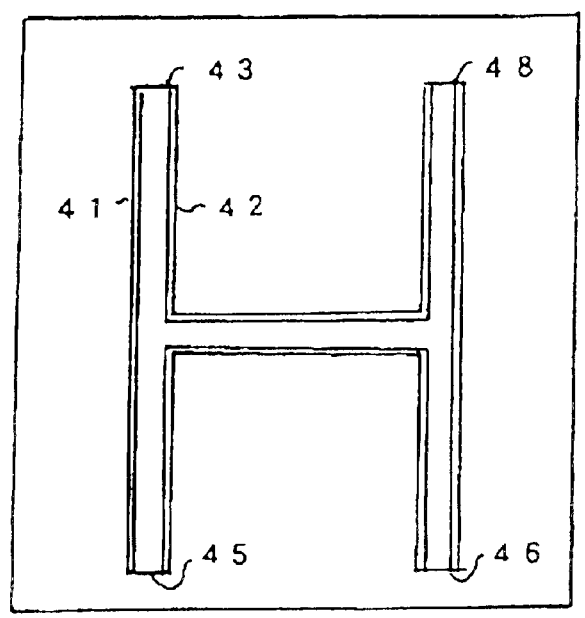
FIG. 10 is a plan view showing a recessed portion of a mold for receiving the connected fastening members shown in FIG. 9.

FIG. 10 illustrates a plan view of a recessed portion of a mold for receiving the connected fastening members shown in FIG. 9. The recessed portion includes a continuous H-shaped groove and shoulders 41, 42. Two vertical recesses have four open ends 43, 45, 46, 48 at their lengthwise ends. When fitting the connected fastening members of FIG. 9 to the recessed portion as shown in FIG. 10, the flexible lateral side portions of the fastening members are bought into close contact with the shoulders of the recess at their intermediate portions to leave no gap therebetween. Also, at the connecting portion between the vertically arranged fastening member and the transversely arranged fastening member, the formation of a gap between the fastening member and the shoulder of the recess can be avoided, because the outer lateral side portion of the vertically arranged fastening member 55 and the flat portion 56 at the lengthwise end of the transversely arranged fastening member are continuously connected in the same plane to ensure the close contact between the shoulder of the recess and the outer lateral side portion. The other connecting portion has the same structure.

The open ends 43, 45, 46, 48 of the recess are sealed by the seal members 32–35 at four lengthwise ends of the vertically arranged fastening members. Connecting member 26 and 27 are provided to hold the fastening members connected to each other. The fastening members shown in FIG. 9 may be provided thereon with ferrite-containing layers to ensure the close contact between the fastening members and the recessed portion by magnetic attraction with magnets disposed in the recessed portion of FIG. 10. In the case of utilizing magnetic attraction, it is preferred to make the both lateral side portions flexible by providing grooves as described above between the lateral side portions and the substrate body. Since the lengthwise ends of the recess are open ends, each fastening member of the connected fastening members shown in FIG. 9 is easily fit to the corresponding recess shown in FIG. 10.

The above three kinds of structures for the connected fastening members and the recessed portion of a mold may be appropriately combined according to requirements of their use.

The fastening members are connected with each other by the connecting member attached to their back surfaces with no engaging elements, and as a result, a plurality of connected fastening members are simultaneously fit to a plurality of corresponding recesses of a mold as shown in FIG. 1 in a single operation. Since the connected fastening members are independent and discontinuous from each other, the respective fastening members are fit to the independent recesses of a mold while maintaining a good sealing between the recess and the fastening members. With this structure, since a molding resin being injected into the mold is prevented from penetrating into the recess, i.e., reaching the surface with engaging elements, a problem of burying the engaging elements can be avoided.

The connecting member used in the present invention is used in a molded article or a porous body each made of a flexible resin and is sized appropriately to sufficiently connect or cover the lengthwise ends of fastening members. The shape may be any appropriate shape including, but not limited to, rectangular, circular, or elliptical. A shape that fits the contours of the fastening members to be connected is also usable. Specific examples of the connecting member include plastic sheets, cloth, non-woven fabric, and foamed resin. The connected fastening members may be fit to the recessed portion of a mold while delicately adjusting relative positions of the fastening members and the recesses. Therefore, the connecting member may be required to be flexible. If the connecting member is not flexible, delicate positioning becomes difficult. The connecting element may be a molded article made of a substantially transparent resin to visually monitor the relative positions of the recesses and the fastening members. The fuse bonding between the connecting member and the fastening members may be enhanced by making both from the same kind of material.

If the connecting member is too flexible, the connected fastening members readily displaces, thereby making maintaining of the fastening members in positions difficult. Therefore, the connecting member preferably has a suitable rigidity. The connecting member is bonded to the fastening members by an adhesive, a pressure-sensitive adhesive, fusion bonding, or any other appropriate fastening member. A cloth tape coated with a pressure-sensitive adhesive is a one exemplary connecting member. When using a resin sheet, the bonding may be made by an ultrasonic fusion bonding or an induction fusion bonding. The back surface of the fastening members may be substantially flat at the lengthwise ends to be interconnected to the connecting member. If the anchoring elements are formed on the back surface of the substrate, the substrate ends to be connected are made flat by removing the anchoring elements, or by applying heat during the connecting operation.

The resin molded article with fastening members according to the present invention is produced by fitting the connected fastening members to the recessed portion of a mold, injecting a liquid molding resin such as polyurethane into the mold, and foaming or curing the resin to embed the fastening members in a surface of the resulting molded article while allowing the engaging elements to be laid bare on the surface.

It is important to prevent the liquid resin from penetrating into the recess by closely contacting the fastening members and the recess to leave no gap therebetween, because the liquid resin penetrating into the recess through a gap buries the engaging elements on the substrate to reduce the engaging function of the engaging elements with the upholstery material covering the molded article. Prevention of the resin from penetrating into the recess can be attained by known structures. For example, one structure includes continuous sealing ridges formed on the front surface of the fastening member along its lateral sides, which are brought into close contact with the longitudinal shoulders of the recess. Another structure includes continuous sealing projections outwardly projecting from the back surface of both lateral side portions of the substrate, which are brought into close contact with the inner surface of the recess when the fastening members are fit to the recess. The prevention may be further attained by forming grooves on the substrate of the fastening member along the lateral sides to render the lateral side portions flexible relative to the substrate body, and providing ferrite-containing layers on the front or back surface of the fastening member. The flexible lateral side portions are brought into close contact with the shoulders of the recess by a magnetic attraction between the ferrite-containing layers and magnets that are disposed on the bottom surface of the recess. To prevent the resin from penetrating into the recess from the lengthwise ends, a weir may be provided to the recess at position corresponding to slightly inside the lengthwise end of the fastening member, or a weir may be provided at the lengthwise end of the fastening member.

The connecting member of the present invention preferably has a structure capable of being firmly bonded to the molding resin since it is embedded therein. When the connecting member is a plastic molded article, suitable protrusions serving as anchoring elements against the resin may be provided on the back surface opposite to the surface to which the fastening members are bonded. Such protrusions may also serve as grips for handling, resulting in improving the workability for fitting the connected fastening members to the recessed portion of a mold. When the connecting member is a cloth, a non-woven fabric, or a resin foamed body, a porous structure is preferred allowing a liquid molding resin to be partially impregnated thereinto. The impregnated resin is then cured to strongly bond the connecting member to the resin molded article.

The resin molded article provided at its surface with the fastening members is covered with an upholstery material upon use. The upholstery material may be made of cloth, non-woven fabric, artificial leather, or the like. On the back surface of the upholstery material, i.e., the surface facing the engaging elements of the fastening members, loop elements may be provided. The loop elements are not particularly restricted as long as they are engageable with the bulged head portions of the fastening members, and include, for example, fibrous loops obtained by knitting or weaving multi-filaments, fibrous material having crimped and raised fibers on the surface thereof, or the like.

Although the connected fastening members arranged in H shape are explained above, the connected fastening members used in the present invention may be arranged in other suitable shapes such as V shape, L shape, T shape, Y shape, K shape, E shape, N shape, M shape, X shape, + shape, Π shape, ⊞ shape, square shape, ± shape and modified shapes thereof.

The present invention is now described in more detail by reference to the following examples. However, it should be noted that the following examples are illustrative and not intended to limit the present invention thereto.

EXAMPLE 1

Fastening members comprising a substrate of 11 mm wide and 0.5 mm thick, and three rows of engaging elements extending along the longitudinal direction of the substrate were used. The engaging elements were raised uprightly from the surface of the substrate and each had a height of 2.5 mm and a width of 0.2 mm in the longitudinal direction of the substrate, and were present at a density of 60 elements per cm2. The engaging elements had a mushroom-shaped tip end spreading in the width direction of the substrate. Two grooves were provided along the lateral sides of the substrate to define two marginal portions of 3 mm wide and 0.5 mm thick. A ferrite-containing layer was formed on only the substrate surface near the foots of the engaging elements. Incidentally, the fastening members, including the marginal portions, were integrally formed from a polypropylene-based resin. To prevent a liquid foaming resin composition from reaching the surface with engaging elements through edges of the recess of a mold, seal elements for absorbing the liquid composition were provided at the lengthwise ends of the fastening members.

Five fastening members corresponding to those of the recesses as shown in FIG. 1 were used, one having a length of 40 cm, and the other four having a length of 50 cm. The fastening members were arranged with their back surface up, as shown FIG. 4. Then, connecting members in the form of polypropylene sheets of 30 mm long, 20 mm wide and 0.5 mm thick were put on the fastening members as shown in FIG. 4, and bonded thereto by ultrasonic fusion to prepare connected fastening members. On the surface opposite to the surface fused to the fastening members, grips were provided to enhance the workability for fitting the connected fastening members to the recessed portion. The grips also served as an anchoring element after the mold-in forming.

Next, the connected fastening members prepared above were fit to a mold for forming a seat cushion having H-shaped recessed portion as shown in FIG. 1, with the surface having the engaging elements facing the bottom surface of the H-shaped recessed portion. Then, a polyurethane resin was poured into the mold, and foamed. Incidentally, magnets were embedded in the bottom surface of the recessed portion. After completely curing the resin, the molded cushion was taken out from the mold. The obtained molded cushion had the connected fastening members integrally and firmly embedded in a surface thereof. The time required for fitting the connected fastening members to the recessed portion was 3.5 sec in average. The working efficiency was extremely high, and substantially no resin penetrated into the surface with the engaging elements.

EXAMPLE 2

The same procedure as in Example 1 was repeated to obtain a molded cushion except for using, as the connecting member, a porous cloth tape coated with an adhesive. The time required for fitting the connected fastening members to the recessed portion was 5 seconds on average. Substantially no resin penetrated into the surface with engaging elements. A sufficient amount of the polyurethane resin penetrated into fibers or textures of the cloth tape to strongly bond the polyurethane resin and the cloth tape.

COMPARATIVE EXAMPLE 1

The same procedure as in Example 1 was repeated to obtain a molded cushion except for manually and separately fitting the respective five fastening members to the recessed portion without using the connecting member. The time required for fitting all the fastening members was 10 sec in average, resulting in deteriorated working efficiency.

In accordance with the present invention, the connected fastening members in which fastening members are connected with each other through a connecting member are fit to the recessed portion of a mold. As a result, the laborious fitting operations of the mold-in fastening members is reduced, and the working efficiency is considerably improved.

Obviously, numerous additional modifications and variations of the present invention are possible in light of the above technique. It is therefore to be understood that within the scope of the appended claims, the present invention may be practiced otherwise than as specifically described herein.

What is claimed is:

1. Connected fastening members, comprising:
    a plurality of mold-in fastening members each including,
        a substrate, said substrate comprising a pair of lateral edges and a pair of lengthwise edges,
        a first surface having a predetermined engaging elements, and
        a second surface with no engaging element; and
    connecting means configured to connect the mold-in fastening members and covering at least a part of the second surface of each said mold-in fastening members,
    wherein a lengthwise end of a first mold-in fastening member is arranged directly in contact with a lengthwise end of at least a second mold-in fastening member, and the connecting means covers the contact area.

2. The connected fastening members according to claim 1, wherein the connecting means includes at least one of a porous material and a resin molded article.

3. The connected fastening members according to claim 1, wherein the first surface is a front surface and the second surface is a back surface.

4. The connected fastening members according to claim 1, further comprising a continuous groove formed on at least one of the first and second side.

5. The connected fastening members according to claim 1, further comprising porous seal members configured to permit a liquid molding resin to penetrate through the lengthwise ends.

6. The connected fastening members according to claim 1, wherein lengthwise ends of the mold-in fastening members include flat portions.

7. The connected fastening members according to claim 1, wherein lengthwise ends of the mold-in fastening members have no engagement elements.

8. The connected fastening members according to claim 1, further comprising one of a magnetic material and ferrite-containing material.

9. The connected fastening members according to claim 1, wherein the connecting means is flexible.

10. A connected fastening member apparatus, comprising:
    a plurality of mold-in fastening members each including,
        a substrate, said substrate comprising a pair of lateral edges and a pair of lengthwise edges,
        a first surface having a predetermined number of engaging elements, and
        a second surface with no engaging element; and
    at least one connecting member configured to connect the mold-in fastening members and to cover at least a part of the second surface of each said fastening member,
    wherein a lengthwise end of a first mold-in fastening member is arranged directly in contact with a lengthwise end of at least a second mold-in fastening member, and the connecting means covers the contact area.

11. The connected fastening member apparatus according to claim 10, wherein the at least one connecting member includes at least one of a porous material and a resin molded article.

12. The connected fastening member apparatus according to claim 10, wherein the first surface is a front surface and the second surface is a back surface.

13. The connected fastening member apparatus according to claim 10, further including a continuous groove formed on at least one of the first and second side.

14. The connected fastening member apparatus according to claim 10, further including porous seal members configured to permit a liquid molding resin to penetrate through the lengthwise ends.

15. The connected fastening member apparatus according to claim 10, wherein lengthwise ends of the mold-in fastening members include flat portions.

16. The connected fastening member apparatus according to claim 10, wherein lengthwise ends of the mold-in fastening members have no engagement elements.

17. The connected fastening member apparatus according to claim 10, further including one of a magnetic material and ferrite-containing material.

18. The connected fastening members according to claim 10, wherein the at least one connecting member is flexible.

* * * * *